(12) United States Patent
Lee et al.

(10) Patent No.: US 11,347,092 B2
(45) Date of Patent: May 31, 2022

(54) LIQUID CRYSTAL DISPLAY DEVICE AND METHOD OF MANUFACTURING THE SAME

(71) Applicant: SAMSUNG DISPLAY CO., LTD., Yongin-si (KR)

(72) Inventors: Boram Lee, Yongin-si (KR); Jiseong Yang, Yongin-si (KR); Taehwan Kim, Yongin-si (KR); Jonghwan Lee, Yongin-si (KR); Seokjoon Hong, Yongin-si (KR)

(73) Assignee: SAMSUNG DISPLAY CO., LTD., Yongin-si (KR)

( * ) Notice: Subject to any disclaimer, the term of this patent is extended or adjusted under 35 U.S.C. 154(b) by 0 days.

(21) Appl. No.: 16/864,908

(22) Filed: May 1, 2020

(65) Prior Publication Data

US 2020/0257160 A1    Aug. 13, 2020

Related U.S. Application Data

(62) Division of application No. 15/189,507, filed on Jun. 22, 2016, now Pat. No. 10,670,902.

(30) Foreign Application Priority Data

Jun. 22, 2015    (KR) .................. 10-2015-0088712

(51) Int. Cl.
  *G02F 1/1333*    (2006.01)
  *G02F 1/1337*    (2006.01)
  *G02F 1/1339*    (2006.01)
(52) U.S. Cl.
  CPC ...... *G02F 1/133377* (2013.01); *G02F 1/1337* (2013.01); *G02F 1/13394* (2013.01)

(58) Field of Classification Search
  CPC ............ G02F 1/133377; G02F 1/1337; G02F 1/133788; G02F 1/133703;
  (Continued)

(56) References Cited

U.S. PATENT DOCUMENTS 9,664,940 B2    5/2017 Hong et al.
2006/0146267 A1    7/2006 Choi et al.
(Continued)

FOREIGN PATENT DOCUMENTS

KR    10-2014-0092802    7/2014
KR    10-2014-0095120    8/2014
(Continued)

*Primary Examiner* — Angela K Davison
(74) *Attorney, Agent, or Firm* — F. Chau & Associates, LLC

(57) ABSTRACT

A liquid crystal display device includes a thin film transistor (TFT) disposed on a substrate. The TFT is divided into pixel regions. Pixel electrodes are disposed in the pixel regions, respectively. The pixel electrodes are electrically connected with the TFT. A roof layer is disposed over the pixel electrodes. Fine spaces, which are spaced apart from each other, are each disposed between each of the pixel electrodes and the roof layer. The fine spaces include a first region and a second region that is below the first region. The second region includes a protrusion protruding in a direction substantially parallel to the substrate with respect to the first region. An alignment layer is disposed on an inner surface of each of the fine spaces. Liquid crystal molecules fill each of the fine spaces.

9 Claims, 24 Drawing Sheets

(58) Field of Classification Search
CPC ...... G02F 2001/133715; C09K 19/544; C09K 2019/548; Y10T 428/249997
See application file for complete search history.

(56) References Cited

U.S. PATENT DOCUMENTS

| | | |
|---|---|---|
| 2012/0249940 A1 | 10/2012 | Choi et al. |
| 2013/0293799 A1* | 11/2013 | Lee .................. G02F 1/13394 349/42 |
| 2014/0009709 A1* | 1/2014 | Lim ................. G02F 1/133377 349/43 |
| 2014/0009712 A1 | 1/2014 | Minowa |
| 2014/0104532 A1 | 4/2014 | Cho et al. |
| 2014/0146278 A1* | 5/2014 | Lee .................. G02F 1/133377 349/110 |
| 2014/0198286 A1 | 7/2014 | Lee et al. |
| 2014/0198290 A1 | 7/2014 | Lim et al. |
| 2014/0354912 A1 | 12/2014 | Lee et al. |
| 2015/0108566 A1 | 4/2015 | Yun et al. |
| 2016/0370643 A1 | 12/2016 | Lee et al. |

FOREIGN PATENT DOCUMENTS

| | | |
|---|---|---|
| KR | 10-2014-0140931 | 12/2014 |
| KR | 10-2015-0019616 | 2/2015 |
| KR | 10-2015-0045607 | 4/2015 |

* cited by examiner

LIQUID CRYSTAL DISPLAY DEVICE AND METHOD OF MANUFACTURING THE SAME

CROSS-REFERENCE TO RELATED APPLICATION

This application is a Division of co-pending U.S. patent application Ser. No. 15/189,507, filed on Jun. 22, 2016, which claims priority to, and the benefit of Korean Patent Application No. 10-2015-0088712, filed on Jun. 22, 2015, in the Korean Intellectual Property Office, the disclosure of which is incorporated by reference herein in its entirety.

TECHNICAL FIELD

The present disclosure relates to a liquid crystal display, and more particularly, to a liquid crystal display device and a method of manufacturing the same.

DISCUSSION OF THE RELATED ART

The use of flat panel display devices in various electronic devices such as mobile phones, personal digital assistants (PDA), computers, and televisions (TV) develop is increasing in popularity. Among flat panel display devices, a liquid crystal display (LCD) device may have low power consumption, a high contrast ratio, etc.

The LCD includes an LC layer disposed between two display plates. An electric field is applied across the LC layer to change the arrangement direction of LC molecules therein. Accordingly, the polarization direction of incident light is changed. An image may be displayed by using a polarizer and thereby allowing the polarization direction of the incident light to determine a degree to which the incident light is allowed to transmit for each pixel.

SUMMARY

One or more exemplary embodiments of the present invention include a liquid crystal display device of a slim profile manufactured by forming a sacrificial layer on a substrate. A roof layer is formed on an upper portion of the sacrificial layer and then the sacrificial layer is removed. Liquid crystal (LC) molecules are disposed into a fine space formed by removing the sacrificial layer.

Before disposing the LC molecules into the fine space, an alignment liquid for forming an alignment layer may be disposed first. However, a phenomenon in which the alignment layer agglomerates at an entry portion and/or inside the fine space may occur during a process of drying the alignment liquid, and the alignment directions of the LC molecules may be twisted and thus a light leakage problems may occur when the display device is used.

One or more exemplary embodiments of the present invention include a liquid crystal display device and a method of manufacturing the same, which reduces light leakage by preventing agglomeration of an alignment layer. However, the instant inventive concept is not limited thereto.

According to one or more exemplary embodiments of the present invention, a liquid crystal display device includes a thin film transistor disposed on a substrate divided into a plurality of pixel regions. A plurality of pixel electrodes is disposed in the plurality of pixel regions, respectively. The pixel electrodes are electrically connected with the thin film transistor. A roof layer is disposed to face the plurality of pixel electrodes. A plurality of fine spaces are separated from each other. Each of the fine spaces are disposed between each of the plurality of pixel electrodes and the roof layer. Each of the fine spaces include a first region, a second region that is below the first region, and a protrusion protruding in a direction substantially parallel to the substrate with respect to the first region. An alignment layer is disposed on an inner surface of each of the plurality of fine spaces. Liquid crystal molecules are disposed filling each of the plurality of fine spaces.

The liquid crystal display device may further include a capping layer disposed between the plurality of fine spaces and sealing the plurality of fine spaces.

The first region may have a frustum of a quadrangular pyramid shape including a first side, a second side, a third side, and a fourth side, and the protrusion may protrude with respect to the first side and the second side facing each other.

The third side and the fourth side may contact the capping layer.

The second region may have a quadrangular shape in a plan view, and may have a width greater than that of the first region with respect to one direction.

The second region may include at least four protrusions disposed at both edge regions of the first side and the second side.

The alignment layer may be disposed on an entire inner surface of each of the plurality of fine spaces except a region contacting the capping layer.

The roof layer may be disposed between the plurality of fine spaces spaced apart from each other along a direction in which the first side and the second side are disposed.

The device may further include a plurality of color filters disposed between the substrate and the plurality of pixel electrodes, respectively. A black matrix may be disposed between the plurality of color filters.

The black matrix may be disposed to correspond to a region between the plurality of fine spaces spaced apart from each other and at least a portion of the black matrix may be disposed to overlap the protrusion in a plan view.

The device may further include a scan line and a data line electrically connected with the thin film transistor and transferring a scan signal and a data signal, respectively, to the thin film transistor. The protrusion may be disposed to overlap at least a portion of at least one of the scan line and the data line in a plan view.

According to one or more exemplary embodiments of the present invention, a method of manufacturing a liquid crystal display device includes forming a thin film transistor on a substrate that is divided into a plurality of pixel regions. A plurality of pixel electrodes electrically connected with the thin film transistor are formed in the plurality of pixel regions, respectively. A plurality of sacrificial layers are formed spaced apart from each other, and the sacrificial layers include an upper region and a lower region including a protrusion protruding in a direction substantially parallel to the substrate with respect to the upper region on the plurality of pixel electrodes. A roof layer is formed to cover the plurality of sacrificial layers. A plurality of injection holes is formed by patterning the roof layer and exposing a portion of each of the plurality of sacrificial layers. A plurality of empty spaces are formed between the pixel electrode and the roof layer by removing the plurality of sacrificial layers. An alignment liquid is disposed into the plurality of empty spaces via the plurality of injection holes. An alignment layer is formed by curing the alignment liquid. Liquid crystal molecules are disposed into the plurality of empty spaces via the plurality of injection holes. The plurality of empty spaces filled with the liquid crystal molecules are sealed by forming a capping layer on the roof layer and forming a plurality of fine spaces in which the plurality of empty spaces are divided.

The fine spaces may include a first region and a second region below the first region and may include a protrusion that protrudes in a direction substantially parallel to the substrate with respect to the first region.

The forming of the plurality of sacrificial layers may include using a halftone mask including a light-shielding portion corresponding to the upper region, a semi-transmitting portion corresponding to the protrusion, and a light-transmitting portion corresponding to the rest of the region.

The method may further include, before the forming of the plurality of pixel electrodes, forming a plurality of color filters and a black matrix between the plurality of color filters on the substrate.

The plurality of sacrificial layers may formed such that the protrusion overlaps the black matrix in a plan view.

The method may further include, before the forming of the plurality of pixel electrodes, forming a scan line and a data line electrically connected with the thin film transistor and transferring a scan signal and a data signal to the thin film transistor, respectively, on the substrate. The plurality of sacrificial layers may be formed such that the protrusion overlaps at least a portion of at least one of the scan line and the data line in a plan view.

The first region may have a frustum of a quadrangular pyramid shape including a first side, a second side, a third side, and a fourth side, and the protrusion may protrude with respect to the first side and the second side facing each other.

The second region may have a quadrangular shape in a plan view, and may have a width greater than that of the first region with respect to one direction.

The second region may include at least four protrusions disposed at both edge regions of the first side and the second side.

One or more exemplary embodiments of the present invention may include a liquid crystal display device and a method of manufacturing the same. Light leakage in the liquid crystal display device may be reduced by preventing agglomeration of an alignment layer thereof.

Also, one or more exemplary embodiments of the present invention include a liquid crystal display device of a slim profile that may be formed by a simple process and a method of manufacturing the same.

As understood by one of ordinary skill in the art, the scope of the inventive concept is not limited to these exemplary embodiments.

BRIEF DESCRIPTION OF THE DRAWINGS

These and/or other aspects of the present inventive concept will become apparent and more readily appreciated from the following description of the exemplary embodiments thereof, taken in conjunction with the accompanying drawings in which.

DETAILED DESCRIPTION

Figure 1:
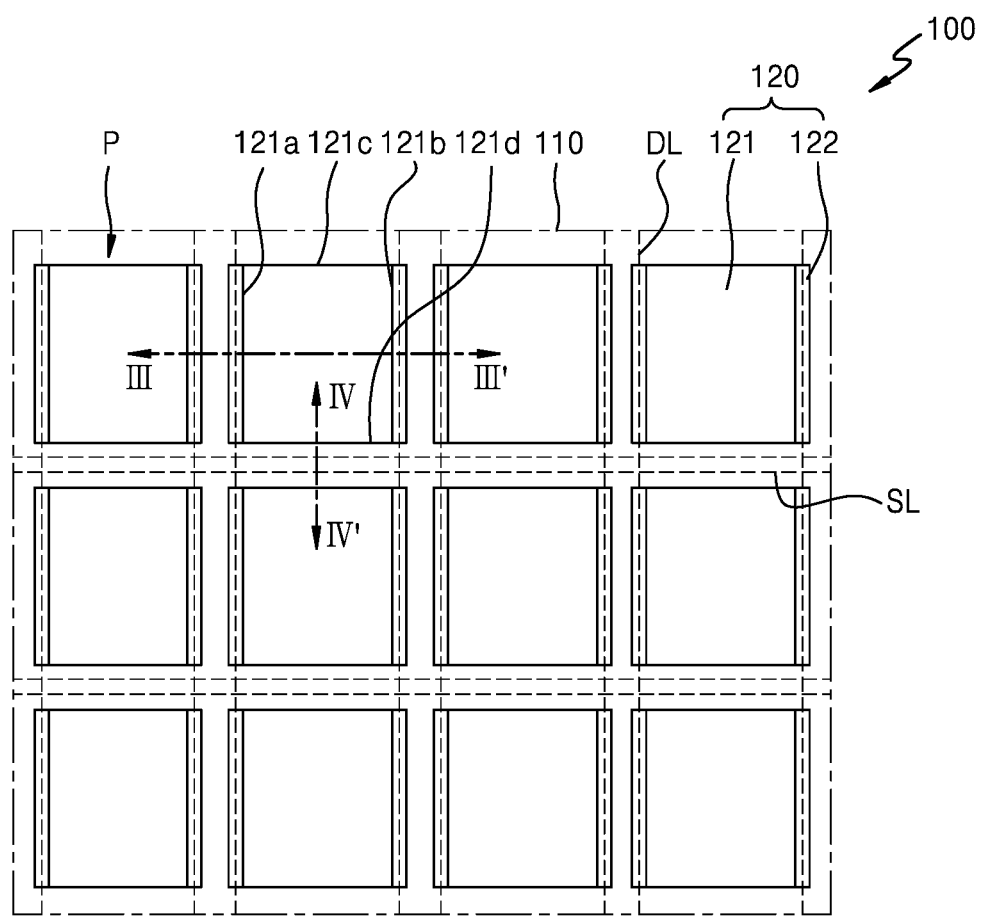
FIG. 1 is a schematic plan view illustrating a liquid crystal display device according to an exemplary embodiment of the present invention.

As the inventive concept allows for various changes and numerous embodiments, exemplary embodiments will be illustrated in the drawings and described in detail in the written description. Characteristics of the inventive concept, and a methods for providing these characteristics will be apparent when exemplary embodiments thereof are described below in detail with reference to the drawings. However, the inventive concept is not limited to exemplary embodiments described below and may be implemented in various additional forms.

It will be understood that although the terms "first", "second", etc. may be used herein to describe various components, these components should not be limited by these terms. These components are only used to distinguish one component from another.

As used herein, the singular forms "a," "an" and "the" are intended to include the plural forms as well, unless the context clearly indicates otherwise.

It will be understood that when a layer, region, or component is referred to as being "formed on," another layer, region, or component, it can be directly or indirectly formed on the other layer, region, or component or intervening layers, regions, or components may be present.

Sizes of elements in the drawings may be exaggerated for convenience of explanation. The following embodiments are not limited thereto.

Hereinafter, exemplary embodiments are described in detail with reference to the accompanying drawings. Like reference numerals may be used for describing like or corresponding elements when description is made with reference to the drawings, and repeated description thereof may be omitted.

Figure 2A:
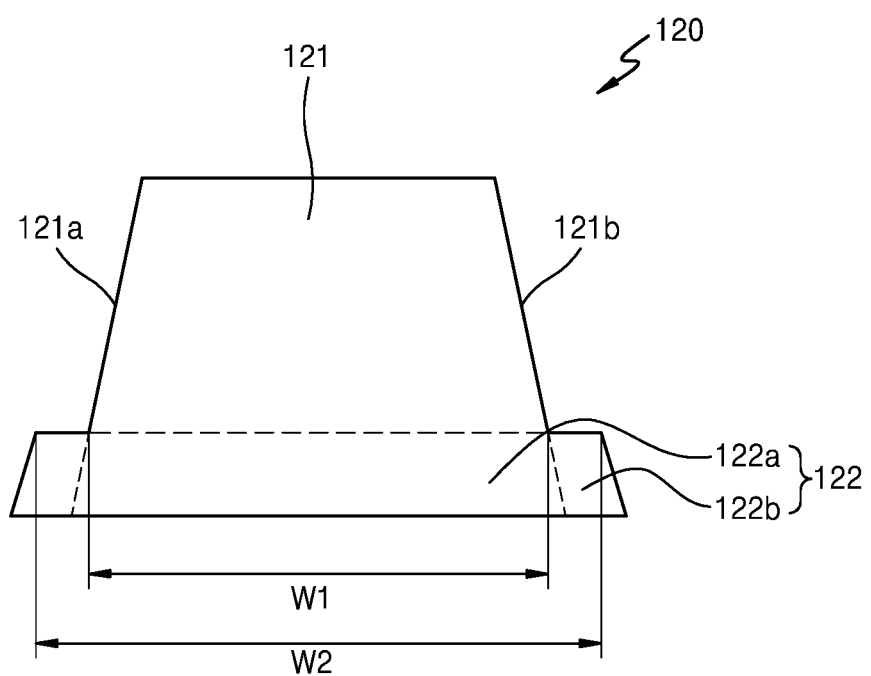
FIGS. 2A and 2B are schematic horizontal and vertical cross-sectional views illustrating a fine space included in the liquid crystal display device of FIG. 1, respectively.
Figure 2B:
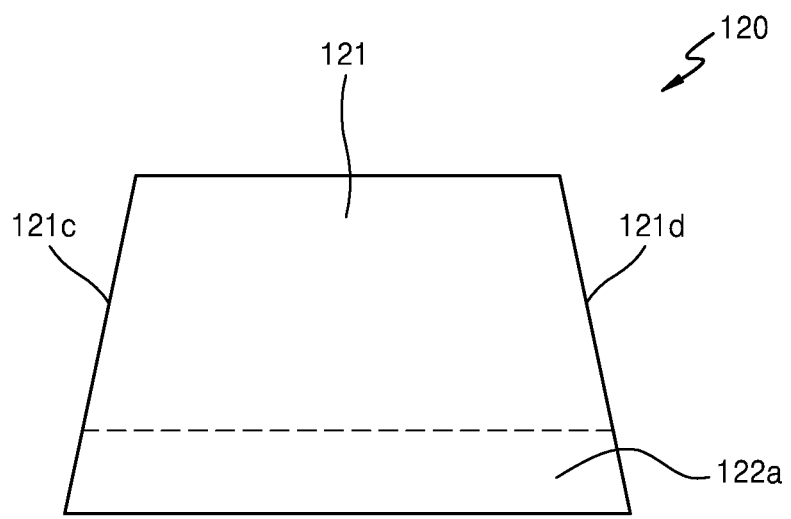
Figure 3:
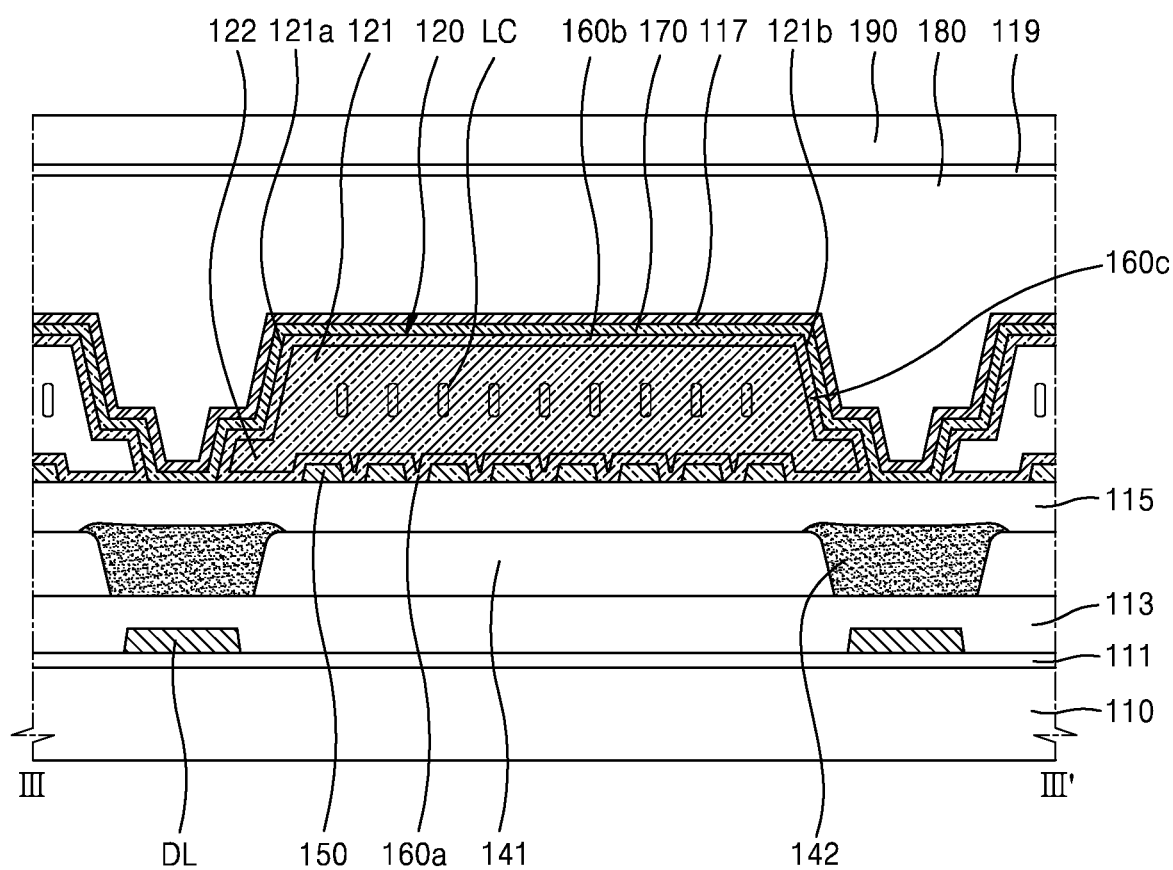
FIG. 3 is a cross-sectional view taken along a line III-III' of FIG. 1.
Figure 4:
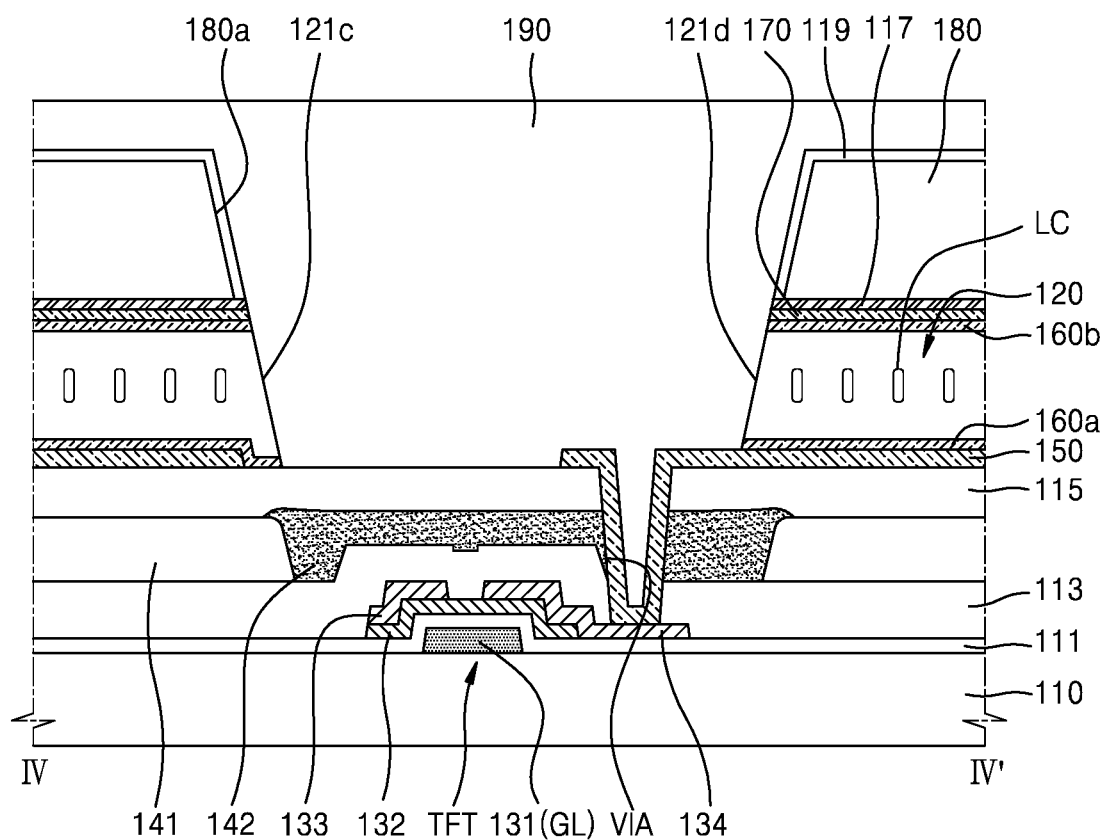
FIG. 4 is a cross-sectional view taken along a line IV-IV' of FIG. 1.

FIG. 1 is a schematic plan view illustrating a liquid crystal display (LCD) device 100 according to an exemplary embodiment of the present invention, FIGS. 2A and 2B are schematic horizontal and vertical cross-sectional views illustrating a fine space included in the LCD device 100 of FIG. 1, respectively. FIG. 3 is a cross-sectional view taken along a line III-III' of FIG. 1, and FIG. 4 is a cross-sectional view taken along a line IV-IV' of FIG. 1.

Referring to FIGS. 1 to 4, the LCD device 100 includes a thin film transistor (TFT) disposed on a substrate 110 divided into a plurality of pixel regions P, a plurality of pixel electrodes 150 disposed in the plurality of pixel regions P, respectively, and electrically connected with the TFT. A roof layer 180 is disposed to face the plurality of pixel electrodes 150, A plurality of fine spaces 120 are separate from each other. Each of the fine spaces 120 includes a first region 121, a second region 122 that is below the first region 121, and a protrusion 122b protruding in a direction substantially parallel to the substrate 110 with respect to the first region 121. Liquid crystal (LC) molecules fill each of the plurality of fine spaces 120 and each of alignment layers 160a, 160b, 160c respectively disposed on inner surfaces of each of the plurality of fine spaces 120.

The substrate 110 may include a material such as glass or plastic and may be divided into the plurality of pixel regions P. The plurality of pixel regions P may be defined by scan lines SL extending in one direction and data lines DL extending in a direction that crosses the one direction.

The TFT may include a gate electrode 131, a semiconductor layer 132, a source electrode 133, and a drain electrode 134. The scan line SL may apply a scan signal to the gate electrode 131, and the data line DL may apply a data signal to the source electrode 133. The drain electrode 134 may be electrically connected with each of the plurality of pixel electrodes 150. A voltage may be selectively applied to each of the plurality of pixel electrodes 150 depending on a switching signal of the TFT. A first insulating layer 111 may be disposed between the gate electrode 131 and the semiconductor layer 132. A second insulating layer 113 may be disposed on the source electrode 133 and the drain electrode 134. For example, the first insulating layer 111 may be a single layer or multiple layers including an inorganic material, and the second insulating layer 113 may be a single layer or multiple layers including an inorganic material or an organic material. The second insulating layer 113 may be omitted if desired.

The gate electrode 131 may be formed of a portion of the scan line SL. The data line DL may include the same material as the source electrode 133 and the drain electrode 134 and may be formed in the layer in which the source electrode 133 and the drain electrode 134 are formed.

A black matrix 142 may be disposed on the scan line SL, the data line DL, and the TFT. A color filter 141 may be disposed in each of the plurality of pixel regions P. The black matrix 142 might not only define the color filter 141 so that mixing of color or light leakage may not occur but the black matrix may also block light that has passed through a circuit portion and light reflected by the circuit portion so that a user may not be able to see the circuit portion such as the TFT.

A third insulating layer 115 may be disposed on the color filter 141 and the black matrix 142. The pixel electrode 150 may be disposed on the third insulating layer 115. For example, the color filter 141 may be disposed between the substrate 110 and the pixel electrode 150, and the black matrix 142 may be disposed between the color filters 141. The pixel electrode 150 may be connected with the drain electrode 134 of the TFT through a via hole VIA formed in the second insulating layer 113, the black matrix 142, and the third insulating layer 115. The third insulating layer 115 may include an inorganic material and may be omitted if desired.

According to an exemplary embodiment of the present invention, the pixel electrode 150 formed in each of the plurality of pixel regions P may include a region in which electrodes are disposed in a slit shape as illustrated in FIG. 3, but the inventive concept is not limited to having a pixel electrode of this shape and the pixel electrode may be formed in various shapes.

The fine space 120 filled with LC molecules may be disposed on the pixel electrode 150. The fine spaces 120, spaced apart from each other, may be disposed in the pixel regions P, respectively. The alignment layers 160a, 160b, 160c may be disposed on the inner surfaces of the fine space 120.

Referring to FIGS. 1, 2A, and 2B, the fine space 120 may include the first region 121 and the second region 122. The first region 121 may have a frustum of a quadrangular pyramid shape including a first side 121a, a second side 121b, a third side 121c, and a fourth side 121d. The protrusion 122b may protrude with respect to the first side 121a and the second side 121b. For example, there might not be a protrusion that protrudes with respect to the third side 121c and the fourth side 121d. Though the lower surface of the fine space 120 is illustrated as being flat in FIGS. 2A and 2B, the lower surface of the fine space 120 may be uneven due to the pixel electrodes 150. However, since the thickness of the pixel electrode 150 is very small compared with the height of the fine space 120, the lower surface of the fine space 120 may be substantially flat.

The second region 122 may have a quadrangular shape in a plan view illustrated in FIG. 1, and may include an overlap region 122a that overlaps the first region 121 and the protrusion 122b that protrudes with respect to the first region 121. The second region 122, including the overlap region 122a and the protrusion 122b, may have a width W2 that is greater than a width W1 of the first region 121 with respect to one direction. The width W1 of the first region 121 and the width W2 of the second region 122 represent widths, respectively, on a plane on which regions tangent to the first region 121 and the second region 122 contact the plane.

The alignment layers 160a, 160b, 160c may be disposed on the entire inner surface of the fine space 120 except the third side 121c and the fourth side 121d. For example, the alignment layers 160a, 160b, 160c may include the region 160a disposed on the upper portion of the pixel electrode 150, the region 160b disposed on the lower portion of a common electrode 170, and the region 160c disposed on the first side 121a and the second side 121b of the fine space 120 and the inner surface of the protrusion 122b.

A phenomenon by which the alignment layers 160a, 160b, 160c agglomerate on the inner surfaces of the fine space 120 may occur during an operation of forming the alignment layers 160a, 160b, 160c, and the alignment direction of LC molecules may be twisted by the agglomeration and thus light leakage may occur. However, according to an exemplary embodiment of the present invention, the fine space 120 includes the protrusion 122b, and the protrusion 122b may be disposed in the edge region of the fine space 120 where the agglomerating may easily occur. For example, the agglomerating of the alignment layers 160a, 160b, 160c may tend to occur at the protrusion 122b.

The fine space 120 is filled with LC molecules, and the LC molecules may include nematic, smectic, cholesteric, or chiral LC material, and may be a negative-type or positive-type LC molecules. The LC molecules may be aligned in a predetermined direction by the alignment layers 160a, 160b, 160c. In the case where a voltage is applied to the pixel electrode 150 and the common electrode 170 and an electric field is generated in a region where the LC molecules are arranged, the LC molecules may be rearranged in a different direction by the electric field.

The black matrixes 142 may be disposed to correspond to regions between the plurality of fine spaces 120 spaced apart from each other, and the protrusion 122b may be disposed to overlap at least a portion of the black matrix 142 in a plan view. For example, light may be blocked by the black matrix 142 and light might not be incident to the protrusion 122b, and thus even when agglomerating of the alignment layers 160a, 160b, 160c occurs at the protrusion 122b, light leakage may not occur. Thus, display quality may be maintained.

The protrusion 122b may be disposed to overlap at least a portion of at least one of the scan line SL and the data line DL, in a plan view, covered with the black matrix 142. According to an exemplary embodiment, the protrusion 122b may overlap at least a portion of the data line DL. An area occupied by the pixel region P in the LCD device 100 may br reduced by the protrusion 122b. However, this may be prevented by extending the protrusion 122b up to a region where the data line DL is disposed.

The common electrode 170 may be disposed on the fine space 120. The pixel electrodes 150 are electrically separated from each other in the pixel regions P, respectively, but the common electrode 170 may be electrically connected to the pixel regions P. A fourth insulating layer 117 may be disposed on the common electrode 170, and the roof layer 180 may be disposed on the fourth insulating layer 117. Though the LCD device 100 according to an exemplary embodiment of the present invention illustrates the case where the common electrode 170 is disposed on the upper portion of the fine space, exemplary embodiments of the inventive concept are not limited thereto, and like the pixel electrodes 150, the common electrode 170 may be disposed on the lower portion of the fine space 120.

The roof layer 180 may include an organic material and may be used to maintain the shape of the fine space 120. The roof layer 180 may be disposed on the upper portion of the fine space 120 and between the plurality of fine spaces 120 spaced apart from each other along a direction in which the first side 121a and the second side 121b are disposed. For example, the roof layer 180 may be disposed between the protrusion 122b that protrudes with respect to the first side 121a of the fine space 120 included in one pixel region P, and the protrusion 122b that protrudes with respect to the second side 121b of the fine space 120 included in another adjacent pixel region P. For example, the protrusions 122b included in the pixel regions P adjacent to each other may be separated by the roof layer 180.

The roof layer 180 may include an opening 180a formed in a region corresponding to the third side 121c and the fourth side 121d of the fine space 120. The opening 180a may serve as an injection hole INJ (see, for example, FIG. 15) for alignment liquid for forming the alignment layers 160a, 160b, 160c and LC molecules. A fifth insulating layer 119 including an inorganic material may be disposed on the upper surface of the roof layer 180 and the surface of the opening 180a. The fifth insulating layer 119 may be omitted if desired.

A capping layer 190 may be disposed on the fifth insulating layer 119. The capping layer 190 may contact the third side 121c and the fourth side 121d of the fine space 120 and may seal the fine space 120 filled with LC molecules. The capping layer 190 may be disposed between the plurality of fine spaces 120 spaced apart from each other along the direction in which the third side 121c and the fourth side 121d of the fine space 120 are disposed. The capping layer 190 may cover all of the third side 121c and the fourth side 121d of the fine space 120, the upper surface of the fifth insulating layer 119, and the lateral sides of the fifth insulating layer 119 that cover the opening 180a of the roof layer 180.

FIGS. 5 to 19 are cross-sectional views illustrating a sequence of steps in a method of manufacturing the LCD device 100 of FIG. 1.

FIGS. 5, 7, 9, 11, 13, 16, and 18 illustrate cross-sections taken along a line III-III' of FIG. 1 according to a manufacturing sequence, and FIGS. 6, 8, 10, 12, 14, 15, 17, and 19 illustrate cross-sections taken along a line IV-IV' of FIG. 1 according to a manufacturing sequence.

Figure 5:
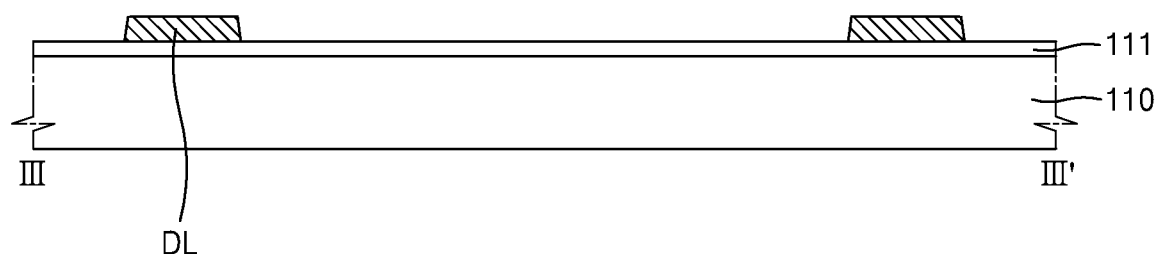
FIGS. 5 to 19 are cross-sectional views sequentially illustrating a method of manufacturing the liquid crystal display device of FIG. 1 in accordance with exemplary embodiments of the present invention.
Figure 6:
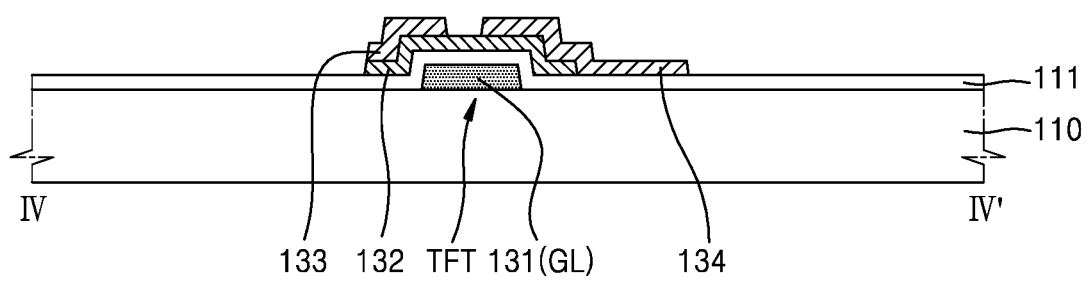

Referring to FIGS. 5 and 6, a TFT including the gate electrode 131, the semiconductor layer 132, the source electrode 133, and the drain electrode 134 may be formed on the substrate 110. The gate electrode 131 may be a portion of a scan line SL. A data line DL may include the same material as the source electrode 133 and the drain electrode 134. The data line DL may be formed in the layer in which the source electrode 133 and the drain electrode 134 are formed. The first insulating layer 111, including an inorganic material, may be formed between the gate electrode 131 and the semiconductor layer 132. The gate electrode 131, the semiconductor layer 132, the source electrode 133, and the drain electrode 134 may be formed by using a general photolithography process.

Figure 7:
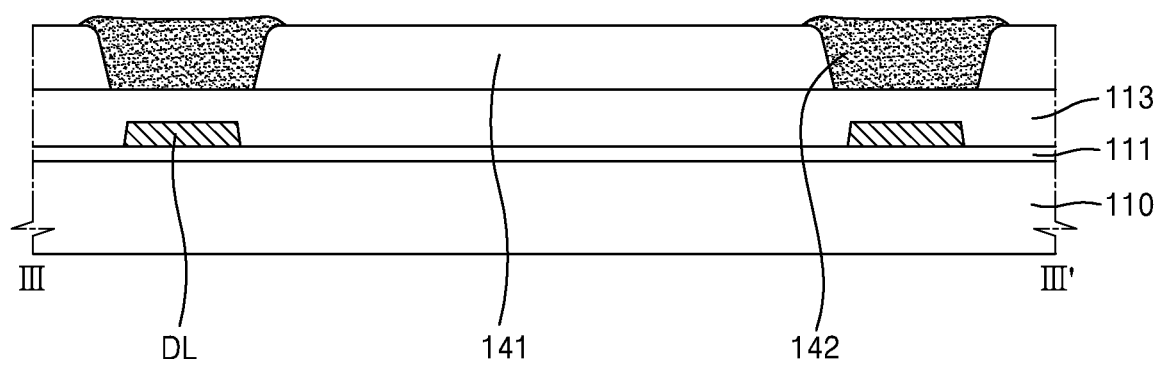
Figure 8:
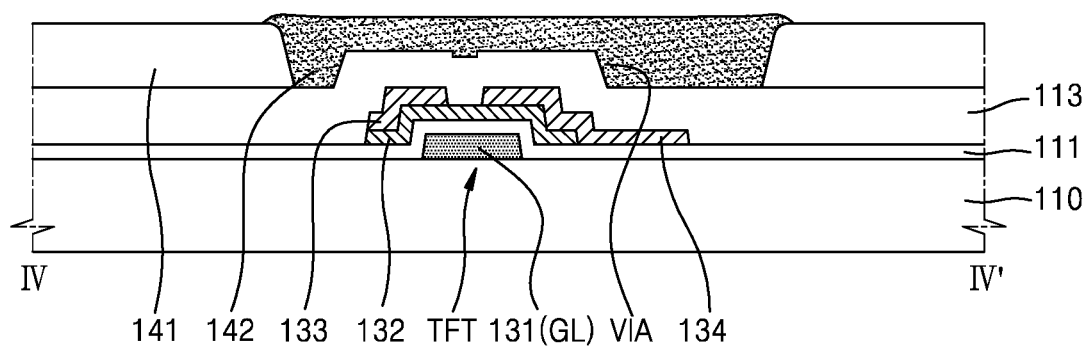

Referring to FIGS. 7 and 8, after the second insulating layer 113 is formed to cover the TFT, the color filter 141 and the black matrix 142 may be formed on the second insulating layer 113. The second insulating layer 113 may be a single layer or layers including an inorganic material or an organic material.

The color filter 141 is formed to correspond to each of the plurality of pixel regions P (refer to FIG. 1), and the black matrix 142 may be formed between the color filters 141. The black matrix 142 may be formed to completely cover the TFT, the scan line SL, and the data line DL. According to an exemplary embodiment of the present invention, the color filter 141 may be a red color filter, a green color filter, or a blue color filter, but the color filter is not limited to being one of these types of color filters.

Though FIGS. 7 and 8 illustrate a configuration in which, after the color filter 141 is formed, the black matrix 142 is formed to cover a portion of the color filter 141, exemplary embodiments of the inventive concept are not limited thereto and the black matrix 142 may be formed first and then the color filter 141 may be formed.

Figure 9:
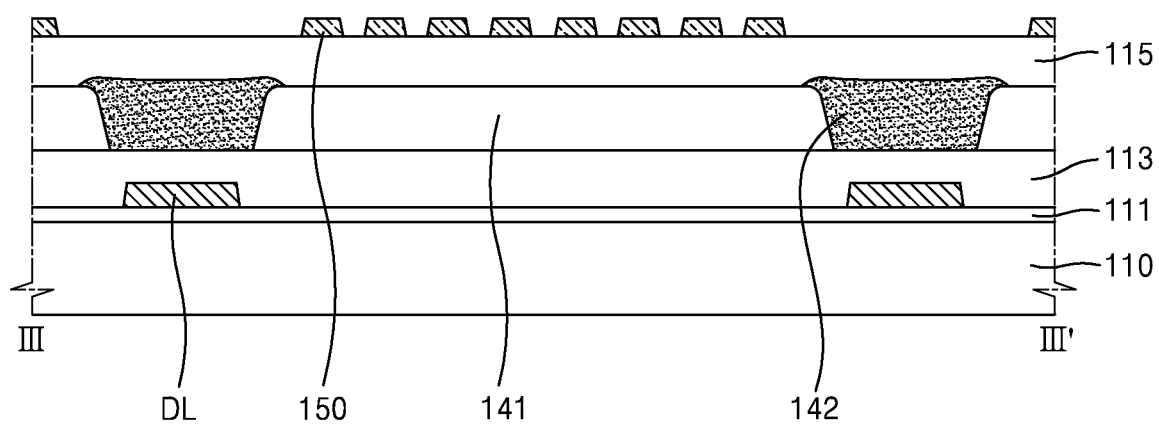
Figure 10:
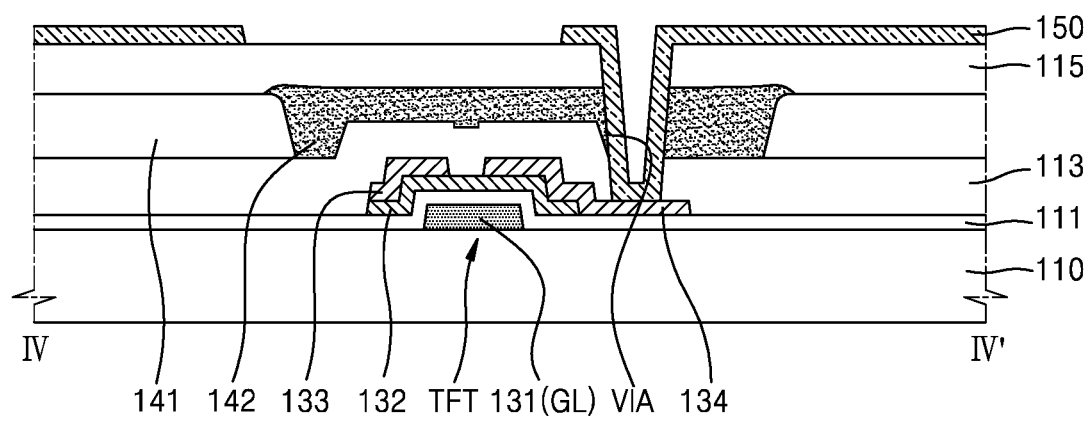

Referring to FIGS. 9 and 10, after the third insulating layer 115 is formed on the color filter 141 and the black matrix 142, a via hole VIA that exposes a portion of the drain electrode 134 may be formed by patterning the second insulating layer 113, the black matrix 142, and the third insulating layer 115. The third insulating layer 115 protects the color filter 141, including an organic material, and the black matrix 142, and may include an inorganic material.

The pixel electrode 150 may be formed such that the pixel electrode 150 is buried in the via hole VIA and contacts the drain electrode 134 exposed through the via hole VIA. The pixel electrode 150 may be formed by depositing a transparent conductive material and then patterning the same. For example, the pixel electrode 150 may include a material such as indium tin oxide (ITO) and indium zinc oxide (IZO). According to an exemplary embodiment of the present invention, the pixel electrode 150 may include a region in which electrodes are disposed in a slit shape, but the pixel electrode 150 is not limited to this configuration and may be formed in various shapes.

Figure 11:
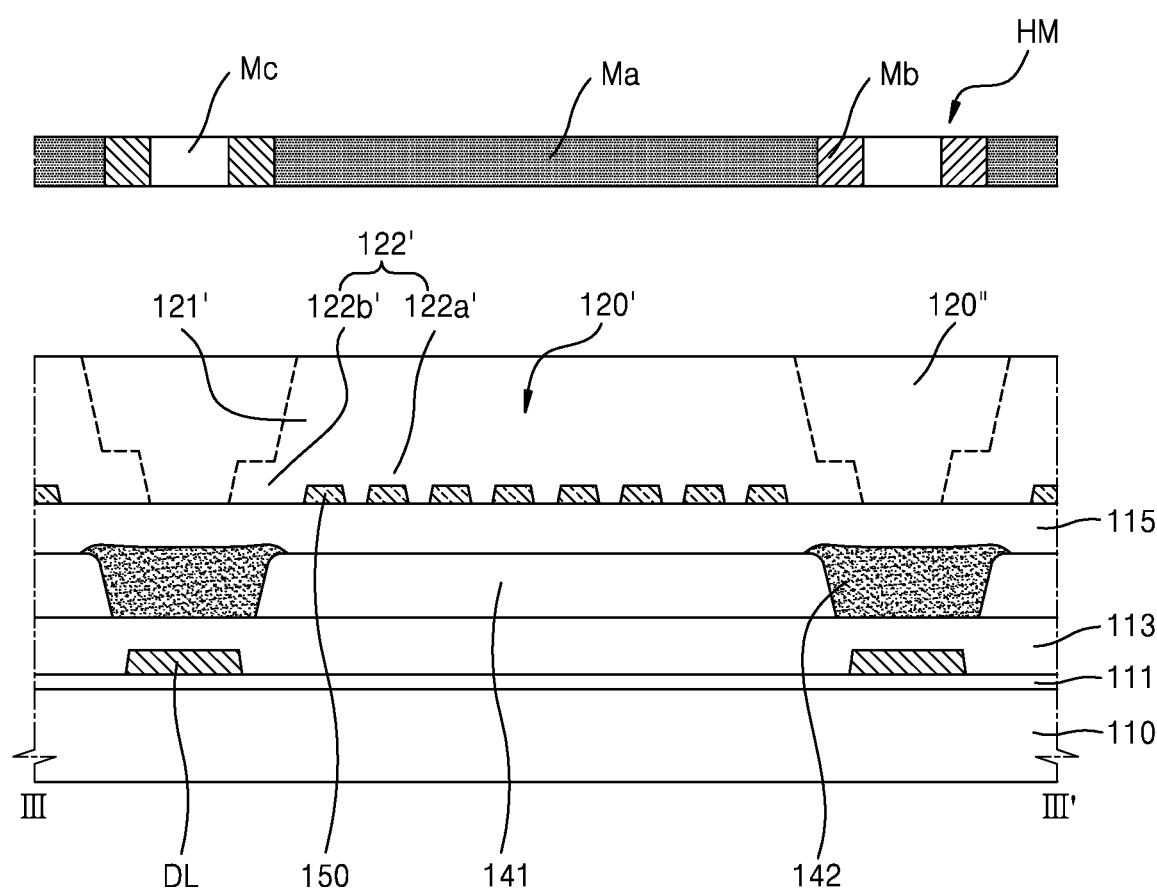
Figure 12:
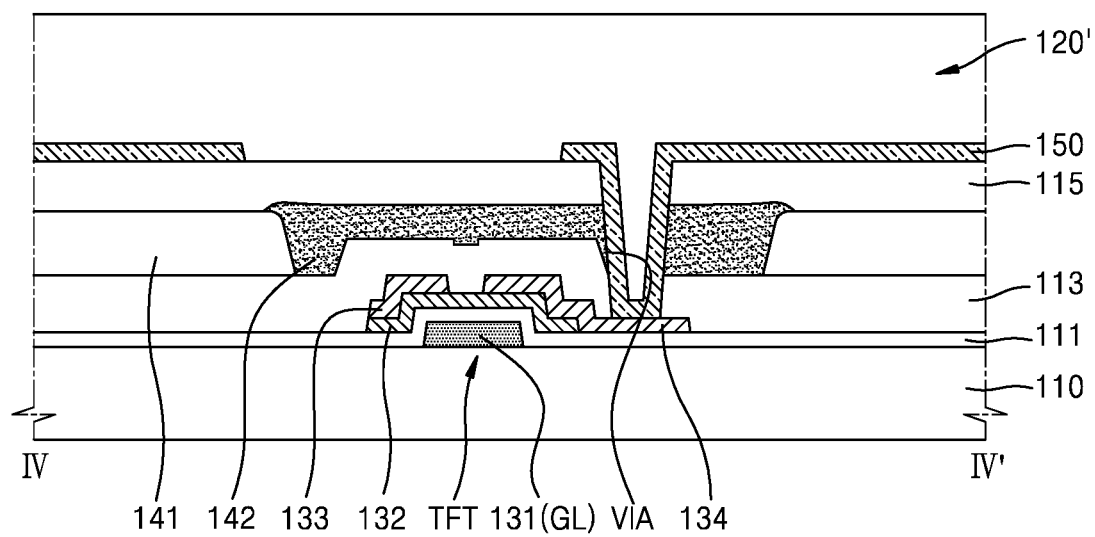

Referring to FIGS. 11 and 12, a sacrificial layer 120' may be formed on the pixel electrode 150. The sacrificial layer 120' may be formed by coating a photosensitive organic material 120" on the pixel electrode 150, illuminating light on the photosensitive organic material 120" such that the light passes through a half tone mask (HM) including a light-shielding portion Ma corresponding to an upper region 121' of the sacrificial layer 120', a semi-transmitting portion Mb corresponding to a protrusion 122b' of the sacrificial layer 120', and a light-transmitting portion Mc corresponding to the rest of the region, and then performing processes such as etching and ashing.

For example, the photosensitive organic material 120" may be a positive photosensitive material such as polyimide. A portion of the photosensitive organic material 120" that corresponds to a region to which light is illuminated through the light-transmitting portion Mc may be completely removed. A portion of the photosensitive organic material 120'', that corresponds to a region to which only a portion of light is illuminated through the semi-transmitting portion Mb, may be partially removed. A portion of the photosensitive organic material 120'' that corresponds to a region to which light is not illuminated due to the light-shielding portion Ma might not be removed.

The sacrificial layer 120' formed by the above-described processes may include the upper region 121' and a lower region 122' below the upper region 121'. The lower region 122' may include the protrusion 122b' that protrudes in a direction substantially parallel to the substrate 110 with respect to the upper region 121'. The lower region 122' may further include an overlap region 122a' that overlaps the upper region 121' in a plan view in addition to the protrusion 122b'.

The sacrificial layer 120' may extend along and over the plurality of pixel regions P in a column direction of FIG. 1, and may be separated for every pixel region P in a row direction of FIG. 1. The protrusion 122b' may be formed to correspond to regions between the pixel regions P separated from each other in the row direction.

Figure 13:
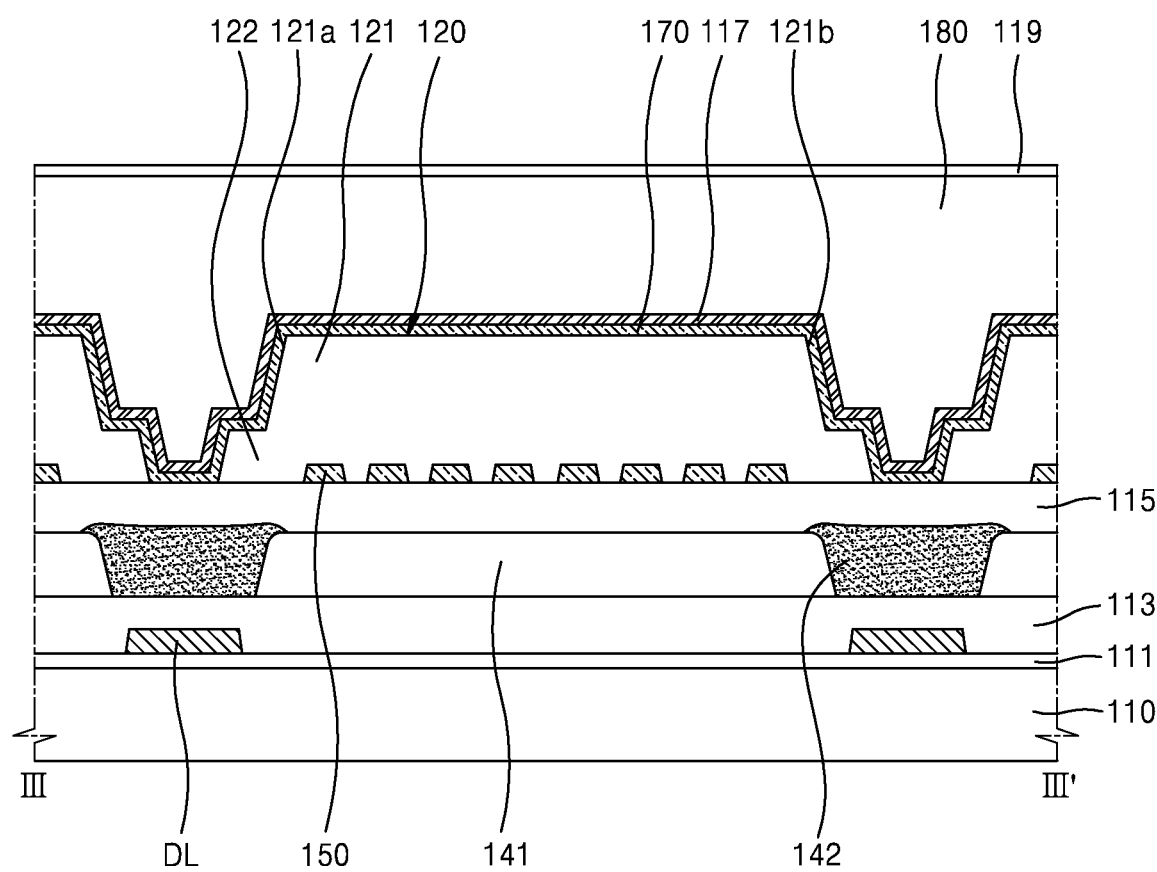
Figure 14:
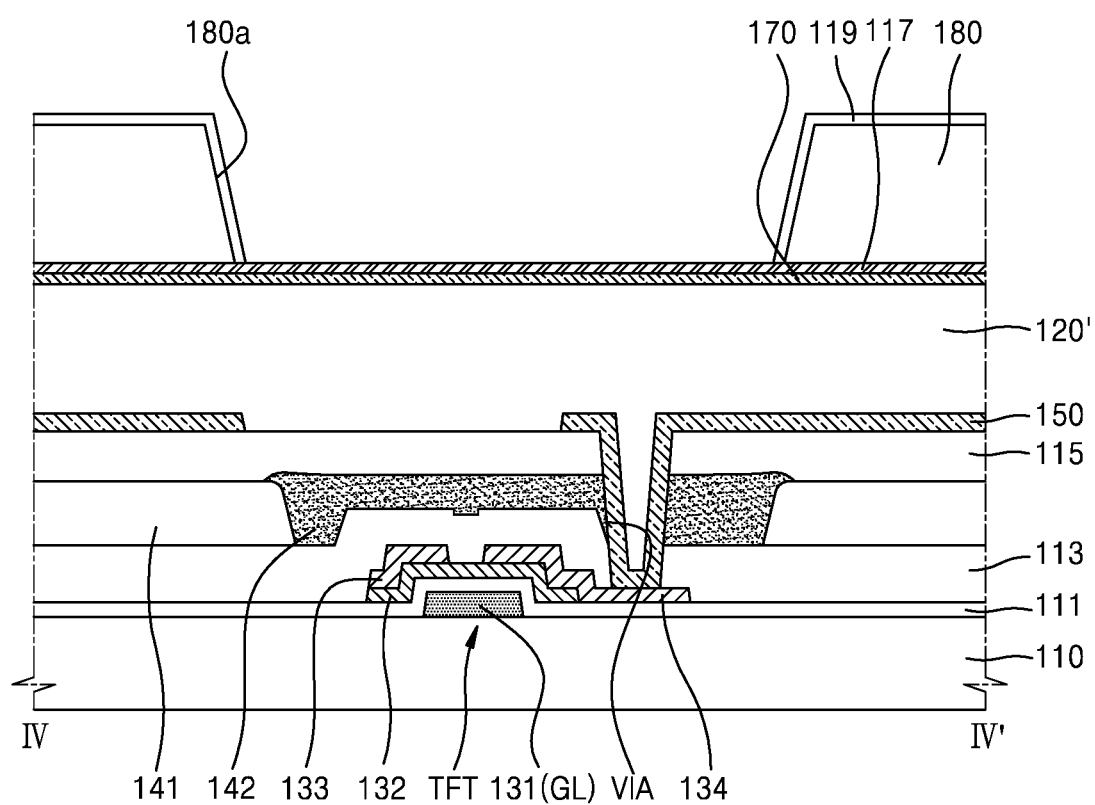

Referring to FIGS. 13 and 14, the common electrode 170, the fourth insulating layer 117, and the roof layer 180 may be formed on the sacrificial layer 120'. The roof layer 180 may be formed on the upper surface of the sacrificial layer 120' and the roof layer 180 may fill a space between the sacrificial layers 120' that are spaced apart from each other.

The opening 180a that exposes a portion of the fourth insulating layer 117 may be formed by forming the roof layer 180 and then patterning the same. After the opening 180a is formed, the fifth insulating layer 119 may be formed on the upper surface of the roof layer 180 and the surfaces of the opening 180a. The fifth insulating layer 119 may include an inorganic material.

Figure 15:
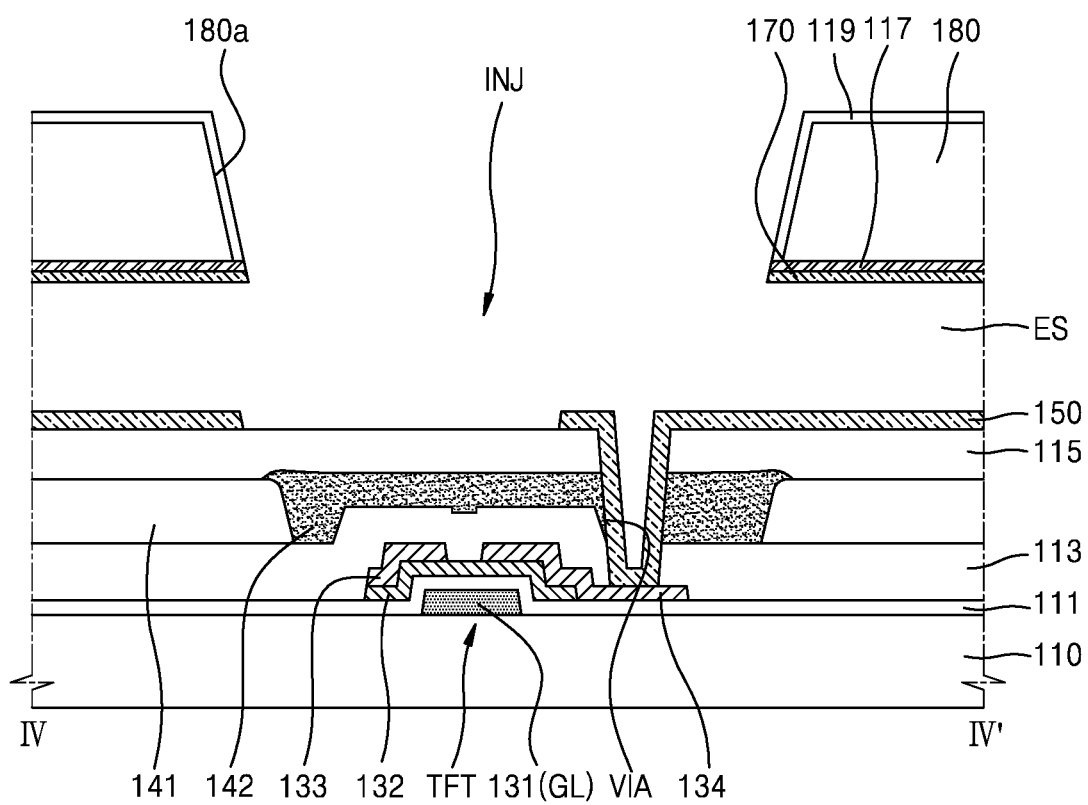

Referring to FIG. 15, the sacrificial layer 120' may be exposed by removing a portion of the fourth insulating layer 117 that is exposed by the opening 180a and a portion of the common electrode 170 disposed on the lower portion of the fourth insulating layer 117 that is exposed by the opening 180a. The sacrificial layer 120' may be etched by supplying developing liquid on the substrate 110 that exposes the portion of the sacrificial layer 120', and remnants of the sacrificial layer 120' may be ashed by using oxygen plasma.

A region from which the sacrificial layer 120' has been removed becomes an empty space ES, and alignment liquid and LC molecules may be disposed into the empty space ES via the opening 180a formed in the roof layer 180. For example, a region in which the opening 180a is formed may correspond to the injection hole INJ.

Figure 16:
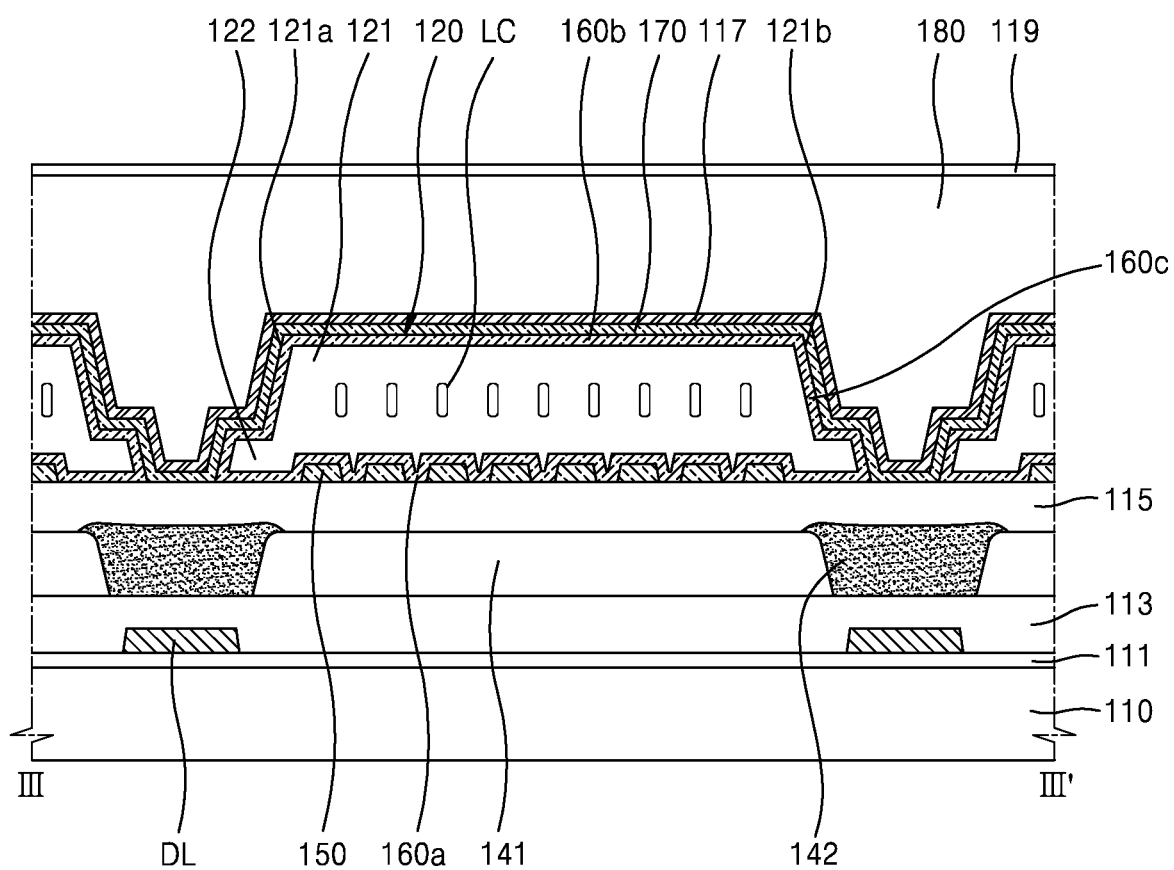
Figure 17:
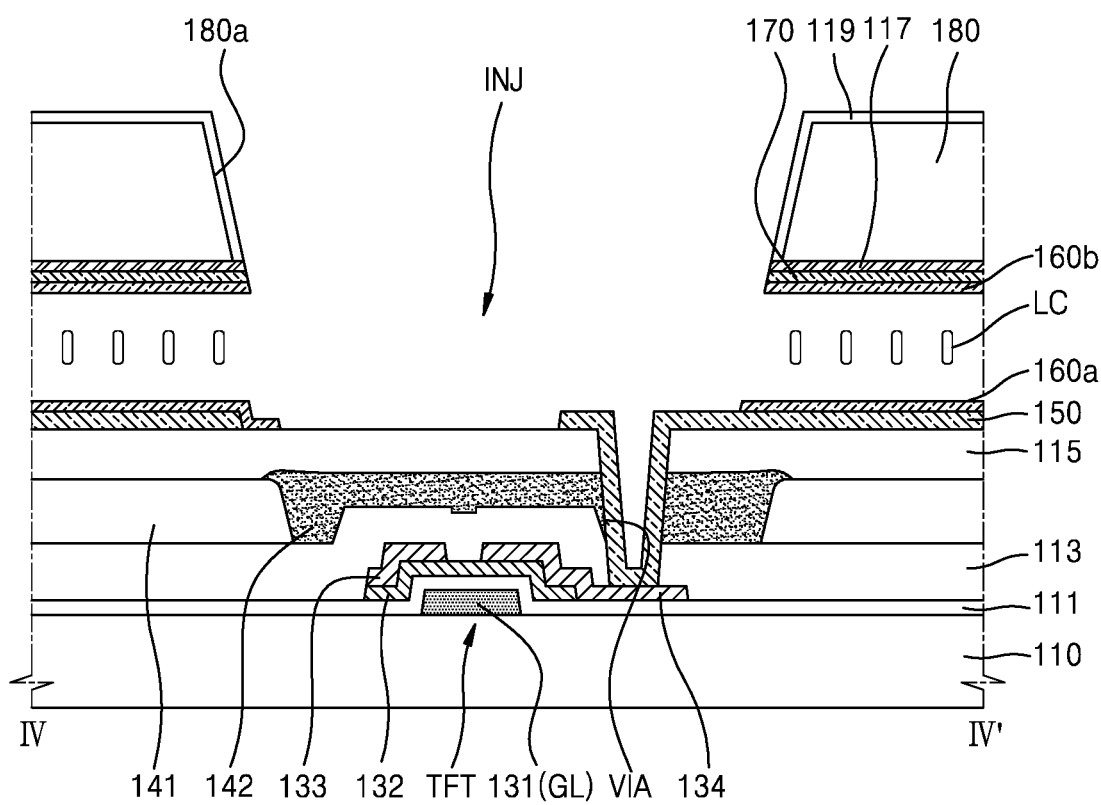

Referring to FIGS. 16 and 17, the alignment layers 160a, 160b, 160c may be formed on the inner surfaces of the empty space ES by depositing the alignment liquid into the empty space ES via the injection hole INJ and curing the same. The alignment layers 160a, 160b, 160c may agglomerate with each other during the curing process. According to an exemplary embodiment of the present invention, the agglomerating may concentrate on a region corresponding to the protrusion 122b' of FIG. 11 of the empty space ES.

The alignment layers 160a, 160b, 160c determine the alignment direction of the LC molecules. When the agglomerating of the alignment layers 160a, 160b, 160c occurs, the alignment direction of the LC molecules may be twisted and thus light leakage may occur. However, as described above, the region corresponding to the protrusion 122b' is a region that overlaps at least a portion of the black matrix 142 and the data line DL and may be the outer region of the pixel region P of FIG. 1 that emits light to outside in order to produce an image. Therefore, even when the agglomerating of the alignment layers 160a, 160b, 160c occurs at the protrusion 122b', light leakage might not be generated due to the agglomerating. Thus, the produced image might not be degraded by the agglomerating of the alignment layers 160a, 160b, 160c.

The empty space ES may be filled with the LC molecules by disposing the LC molecules into the empty space ES through the injection hole INJ after forming the alignment layers 160a, 160b, 160c.

Figure 18:
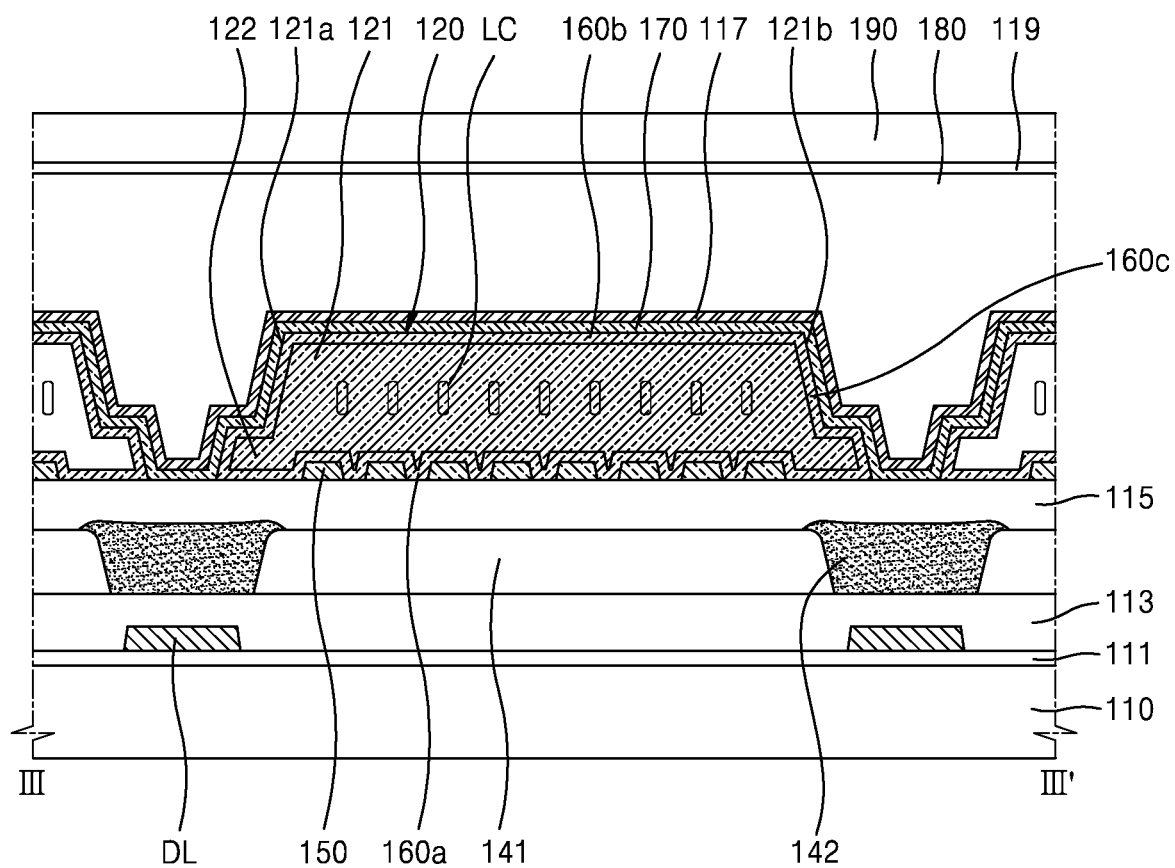
Figure 19:
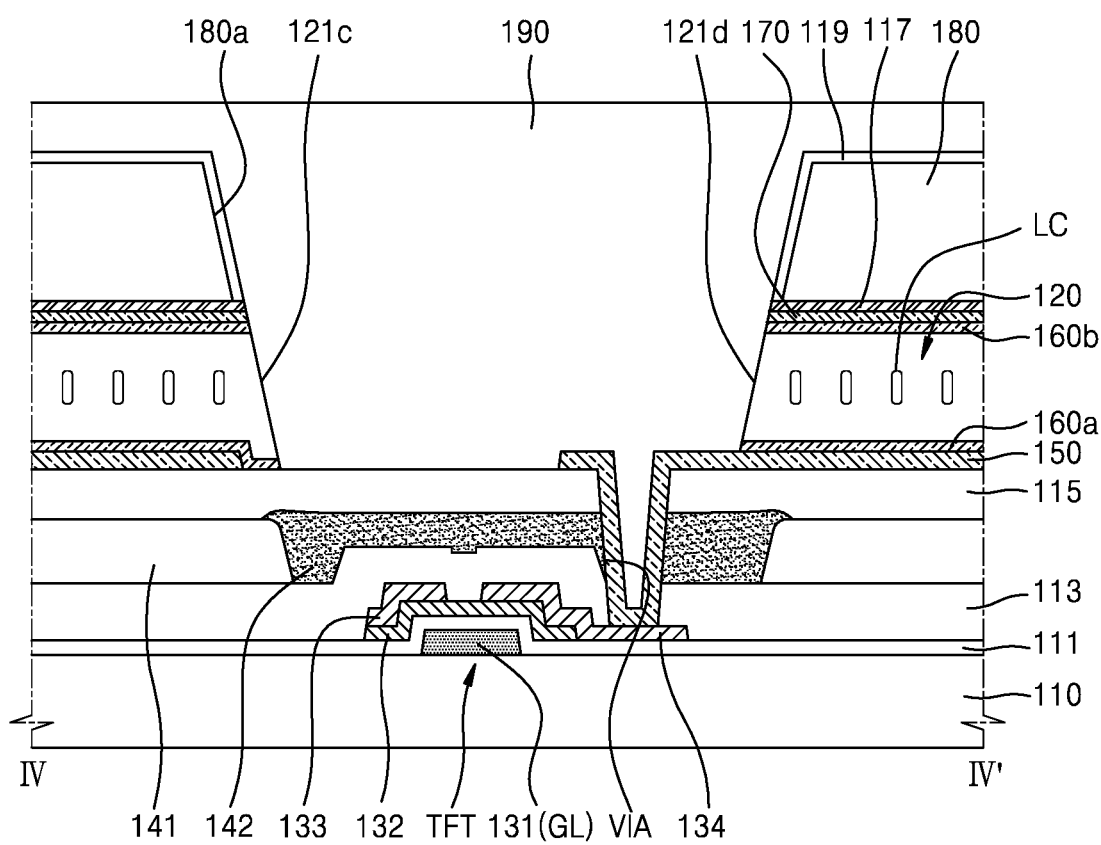

Referring to FIGS. 18 and 19, the capping layer 190 may be formed on the fifth insulating layer 119 to seal the space filled with the LC molecules. The capping layer 190 may completely cover the injection hole INJ, and may form the fine space 120 by separating the space filled with the LC molecules on a pixel region basis (refer to the pixel region P of FIG. 1).

As described with reference to FIGS. 2A and 2B, the fine space 120 may include the first region 121, the second region 122, which is disposed below the first region 121, and the protrusion 122b that protrudes in a direction substantially parallel to the substrate 110 with respect to the first region 121.

Referring to FIG. 2A again, the first region 121 may have a frustum of a quadrangular pyramid shape including the first side 121a, the second side 121b, the third side 121c, and the fourth side 121d. The protrusion 122b may protrude with respect to the first side 121a and the second side 121b facing each other.

The second region 122 may have a quadrangular shape in a plan view and may have the width W2 greater than the width W1 of the first region 121 with respect to one direction. The width W1 of the first region 121 and the width W2 of the second region 122 represent widths, respectively, on a plane on which regions tangent to the first region 121 and the second region 122 contact the plane.

Figure 20:
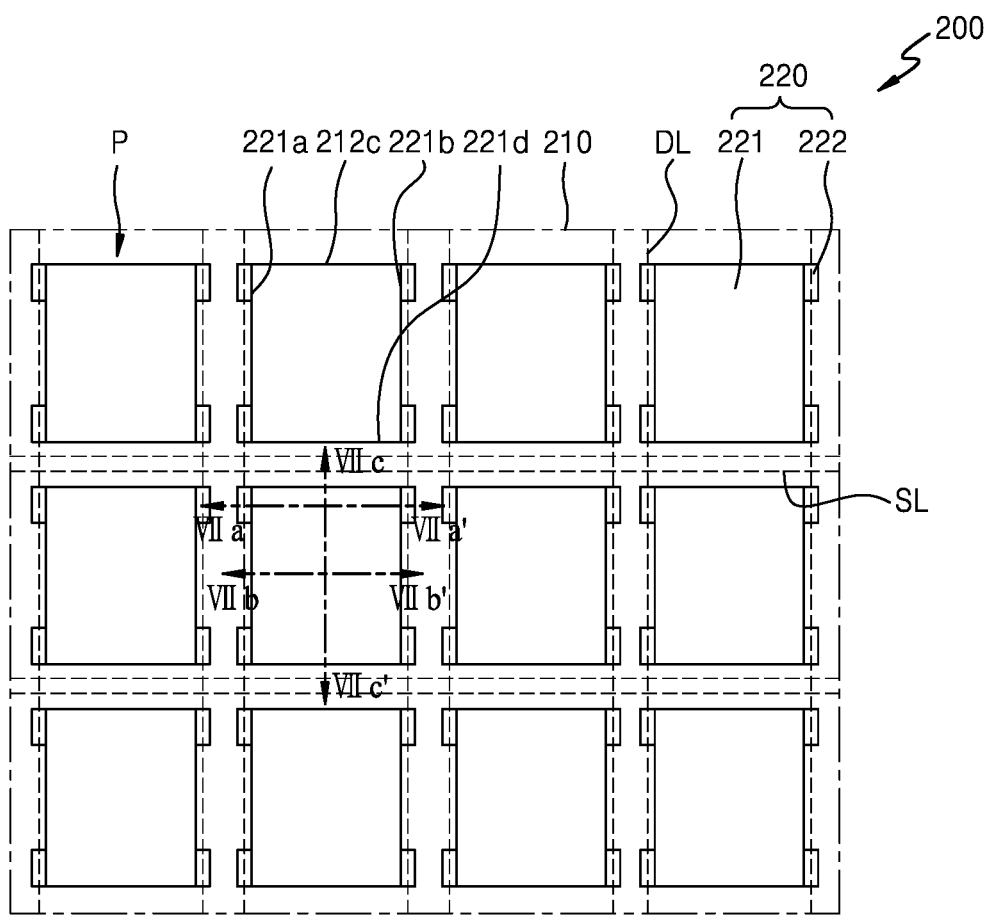
FIG. 20 is a schematic plan view illustrating a liquid crystal display device according to an exemplary embodiment of the present invention.
Figure 21A:
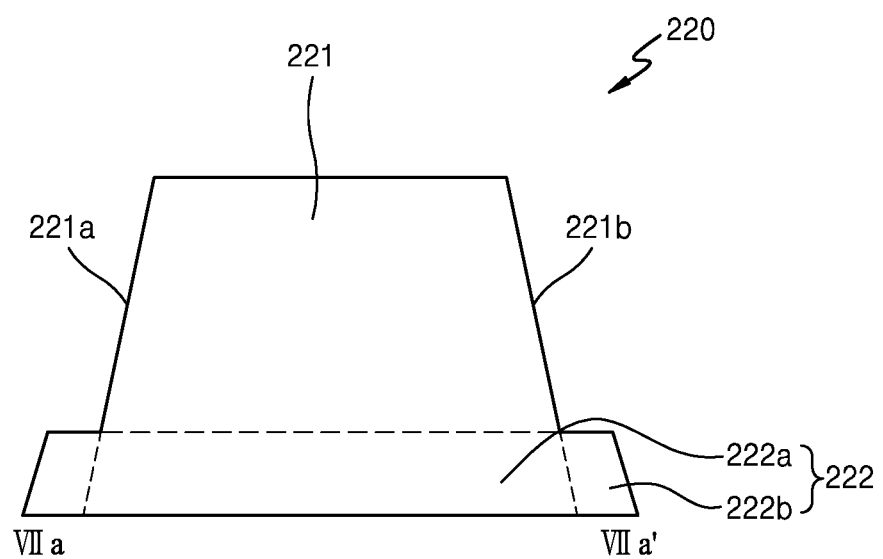
FIGS. 21A, 21B, and 21C are cross-sectional views taken along lines VIIa-VIIa', VIIb-VIIb', and VIIc-VIIc' of a fine space included in a liquid crystal display device of FIG. 20.
Figure 21B:
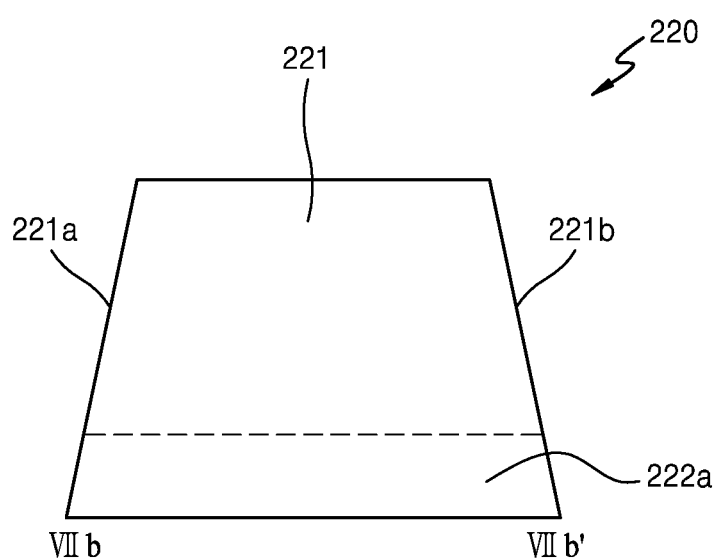
Figure 21C:
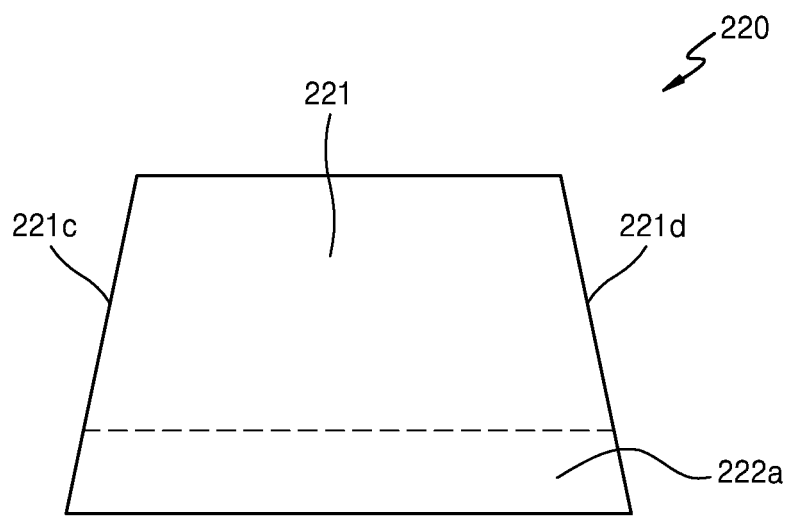

FIG. 20 is a schematic plan view illustrating an LCD device 200 according to an exemplary embodiment of the present invention and FIGS. 21A, 21B, and 21C are cross-sectional views taken along lines VIIa-VIIa', VIIb-VIIb', and VIIc-VIIc' of a fine space included in an LCD device of FIG. 20.

Referring to FIGS. 20, 21A, 21B, and 21C, the LCD device 200, according to an exemplary embodiment of the present invention, may include the TFT (such as that shown in FIG. 4) disposed on a substrate 210 that is divided into a plurality of pixel regions P. The plurality of pixel electrodes 150 (such as that shown in FIG. 3) are disposed in the plurality of pixel regions P, respectively, and are electrically connected with the TFT. The roof layer 180 (such as that shown in FIG. 3) is disposed to face the plurality of pixel electrodes 150, and a plurality of fine spaces 220 which are spaced apart from each other. Each of the fine spaces are disposed between each of the plurality of pixel electrodes 150 and the roof layer 180. The fine spaces 220 include a first region 221, a second region 222 disposed below the first region 221, and a protrusion 222b that protrudes in a direction substantially parallel to the substrate 210 with respect to the first region 221. The alignment layers 160a, 160b, 160c (of FIG. 3) may be respectively disposed on inner surfaces of each of the plurality of fine spaces 120. The LC molecules (such as those shown in FIG. 3) may fill the inside of each of the plurality of fine spaces 220.

Since aspects other than the fine space 220 of the LCD device 200 of FIG. 20 may be the same as those of the LCD device 100 of FIG. 1, descriptions of these other aspects are omitted.

The fine space 220 may include the first region 221 and the second region 222. The first region 221 may have a frustum of a quadrangular pyramid shape including a first side 221a, a second side 221b, a third side 221c, and a fourth side 221d. The protrusion 222b may protrude with respect to the first side 221a and the second side 221b. That is, there may not be a protrusion that protrudes with respect to the third side 221c and the fourth side 221d.

The second region 222 may include an overlap region 222a that overlaps the first region 221 and at least four protrusions 222b that protrude from both edge regions of the first side 221a and the second side 221b of the first region 221. Though FIG. 20 illustrates an exemplary embodiment in which the number of protrusions 222b is four, exemplary embodiments of the inventive concept are not limited thereto and the number of protrusions 222b may be less than or greater than four.

The edge regions of the first side 221a and the second side 221b are regions in which agglomerating of the alignment layers 160a, 160b, 160c (of FIG. 3) mainly occurs when the alignment layers 160a, 160b, 160c are formed by curing alignment liquid. Light leakage may be reduced or prevented by forming the protrusions 222b at the edge regions and preventing the agglomerating of the alignment layers 160a, 160b, 160c formed on positions corresponding to the pixel region P that produces an image.

Exemplary embodiments of the present invention may provide an LCD device of a slim profile that may reduce or prevent light leakage by preventing agglomerating of the alignment layers. The LCD device may be formed by a simple process in accordance with exemplary embodiments of the present invention.

While one or more exemplary embodiments of the present invention have been described herein with reference to the figures, it will be understood by those of ordinary skill in the art that various changes in form and details may be made therein without departing from the spirit and scope of the present invention.

What is claimed is:

1. A method of manufacturing a liquid crystal display device, the method comprising: forming a thin film transistor on a substrate, the substrate being divided into a plurality of pixel regions; forming a plurality of pixel electrodes in the plurality of pixel regions, respectively, wherein the plurality of pixel electrodes are electrically connected with the thin film transistor; forming a plurality of sacrificial layers spaced apart from each other, and comprising an upper region and a lower region, the lower region comprising a sacrificial layer protrusion protruding in a direction substantially parallel to the substrate with respect to the upper region on the plurality of pixel electrodes;
forming a roof layer covering the plurality of sacrificial layers; forming a plurality of injection holes by patterning the roof layer and exposing a portion of each of the plurality of sacrificial layers; forming a plurality of empty spaces between the pixel electrode and the roof layer by removing the plurality of sacrificial layers; disposing alignment liquid into the plurality of empty spaces via the plurality of injection holes; forming an alignment layer by curing the alignment liquid; disposing liquid crystal molecules into the plurality of empty spaces via the plurality of injection holes; and sealing the plurality of empty spaces filled with the liquid crystal molecules by forming a capping layer on the roof layer, and forming a plurality of fine spaces in which the plurality of empty spaces are divided, wherein the fine spaces include a first region and a second region that is disposed below the first region, and the second region comprising a fine space protrusion that protrudes, from the first region, in a direction substantially parallel to the substrate, with the second region fine space protrusion having a top surface that is parallel to the substrate, and wherein the top surface of the fine space protrusion directly contacts the alignment layer.

2. The method of claim 1, wherein the fine spaces have a two-tiered shape in which the second region forms a step between two tiers of the two-tiered shape of the fine spaces.

3. The method of claim 1, wherein the forming of the plurality of sacrificial layers uses a half tone mask comprising a light-shielding portion corresponding to the upper region, a semi-transmitting portion corresponding to the sacrificial layer protrusion, and a light-transmitting portion corresponding to a portion of the lower region that is not the sacrificial layer protrusion.

4. The method of claim 1, further comprising forming a plurality of color filters in the substrate and forming a black matrix disposed between the plurality of color filters on the substrate, prior to forming the plurality of pixel electrodes.

5. The method of claim 4, wherein the plurality of sacrificial layers is formed such that the sacrificial layer protrusion overlaps the black matrix in a plan view.

6. A method of manufacturing a liquid crystal display device, the method comprising:
forming a thin film transistor on a substrate, the substrate being divided into a plurality of pixel regions;
forming a plurality of pixel electrodes in the plurality of pixel regions, respectively, wherein the plurality of pixel electrodes are electrically connected with the thin film transistor;
forming a plurality of sacrificial layers spaced apart from each other, and comprising an upper region and a lower region, the lower region comprising a protrusion protruding in a direction substantially parallel to the substrate with respect to the upper region on the plurality of pixel electrodes;
forming a roof layer covering the plurality of sacrificial layers;
forming a plurality of injection holes by patterning the roof layer and exposing a portion of each of the plurality of sacrificial layers;
forming a plurality of empty spaces between the pixel electrode and the roof layer by removing the plurality of sacrificial layers;
disposing alignment liquid into the plurality of empty spaces via the plurality of injection holes;
forming an alignment layer by curing the alignment liquid;
disposing liquid crystal molecules into the plurality of empty spaces via the plurality of injection holes;
sealing the plurality of empty spaces filled with the liquid crystal molecules by forming a capping layer on the roof layer, and forming a plurality of fine spaces in which the plurality of empty spaces are divided; and
forming a scan line and a data line electrically connected with the thin film transistor and transferring a scan signal and a data signal to the thin film transistor, respectively, on the substrate, prior to forming the plurality of pixel electrodes, wherein the plurality of sacrificial layers is formed such that the protrusion overlaps at least a portion of at least one of the scan line and the data line in a plan view.

7. A method of manufacturing a liquid crystal display device, the method composing:
   forming a thin film transistor on a substrate, the substrate being divided into a plurality of pixel regions;
   forming a plurality of pixel electrodes in the plurality of pixel regions, respectively, wherein the plurality of pixel electrodes are electrically connected with the thin film transistor;
   forming a plurality of sacrificial lavers spaced apart from each other, and comprising an upper region and a lower region the lower region comprising a sacrificial layer protrusion protruding in a direction substantially parallel to the substrate with respect to the upper region on the plurality of pixel electrodes;
   forming a roof layer covering the plurality of sacrificial layers;
   forming a plurality of injection holes by patterning the roof layer and exposing a portion of each of the plurality of sacrificial lavers;
   forming a plurality of empty spaces between the pixel electrode and the roof layer by removing the plurality of sacrificial layers;
   disposing alignment liquid into the plurality of empty spaces via the plurality of injection holes;
   forming an alignment layer by curing the alignment liquid;
   disposing liquid crystal molecules into the plurality of empty spaces via the plurality of injection holes; and
   sealing the plurality of empty spaces filled with the liquid crystal molecules by firming a capping layer on the roof layer, and forming a plurality of fine spaces in which the plurality of empty spaces are divided,
   wherein the fine spaces include first region and a second region that is disposed below the first region, and the second region comprising a fine space protrusion thin protrudes from the first region in a direction substantially parallel to the substrate, and
   wherein the first region has a frustum-of-a-quadrangular-pyramid shape comprising a first side, a second side, a third side, and a fourth side, with the first side and the second side being opposite to each other, and the fine space protrusion protrudes from the first side and the second side.

8. The method of claim 7, wherein the second region has a quadrangular shape in a plan view, and the second region has a width that is greater than that of the first region.

9. The method of claim 7, wherein the second region comprises at least four fine space protrusions, including the fine space protrusion, that protrude from an edge region of the first side and an edge region of the second side.

* * * * *